(12) United States Patent
Yajima

(10) Patent No.: US 7,191,049 B2
(45) Date of Patent: Mar. 13, 2007

(54) VEHICLE DRIVE ASSIST SYSTEM

(75) Inventor: Koji Yajima, Tokyo (JP)

(73) Assignee: Fuji Jukagyo Kabushiki Kaisha, Tokyo (JP)

( * ) Notice: Subject to any disclaimer, the term of this patent is extended or adjusted under 35 U.S.C. 154(b) by 316 days.

(21) Appl. No.: 10/792,151

(22) Filed: Mar. 3, 2004

(65) Prior Publication Data

US 2004/0176900 A1    Sep. 9, 2004

(30) Foreign Application Priority Data

Mar. 3, 2003    (JP)    ............... 2003-056271

(51) Int. Cl.
*B60K 31/00*    (2006.01)
*B60T 8/32*    (2006.01)

(52) U.S. Cl. ............ 701/96; 701/93; 701/301; 180/167; 180/170; 340/435; 340/436

(58) Field of Classification Search ............ 701/24, 701/70, 96, 93, 300–302, 23; 180/167–170; 340/425.5, 435, 436, 438, 901, 903
See application file for complete search history.

(56) References Cited

U.S. PATENT DOCUMENTS

| | | | |
|---|---|---|---|
| 6,032,097 A * | 2/2000 | Iihoshi et al. ............ | 701/96 |
| 6,191,704 B1 | 2/2001 | Takenaga et al. | |
| 6,397,149 B1 * | 5/2002 | Hashimoto ............ | 701/300 |
| 6,653,935 B1 | 11/2003 | Winner et al. | |
| 6,856,896 B2 * | 2/2005 | Kushida et al. ......... | 701/207 |

FOREIGN PATENT DOCUMENTS

| | | |
|---|---|---|
| DE | 199 54 536 A1 | 5/2001 |
| EP | 0 889 456 A2 | 1/1999 |
| JP | 11-108661 | 4/1999 |

* cited by examiner

*Primary Examiner*—Yonel Beaulieu
(74) *Attorney, Agent, or Firm*—Smith, Gambrell & Russell

(57) ABSTRACT

When an own vehicle makes a follow-up traveling control targeting a preceding vehicle traveling ahead of the own vehicle, in case where the widthwise movement of the preceding is detected and a second preceding vehicle traveling ahead of the preceding vehicle is detected, the preceding vehicle is regarded as undertaking to pass the second preceding vehicle and acceleration of the own vehicle is inhibited. Further, in a situation where the preceding vehicle and the second preceding vehicle run in parallel, these vehicles can be recognized discriminatingly from each other based on the memorized widths of theses vehicle and the direction of the widthwise movement of the preceding vehicle. Further, when it is judged that the preceding vehicle travels faster than the second preceding vehicle, the target of the follow-up traveling control is changed to the second preceding vehicle.

17 Claims, 6 Drawing Sheets

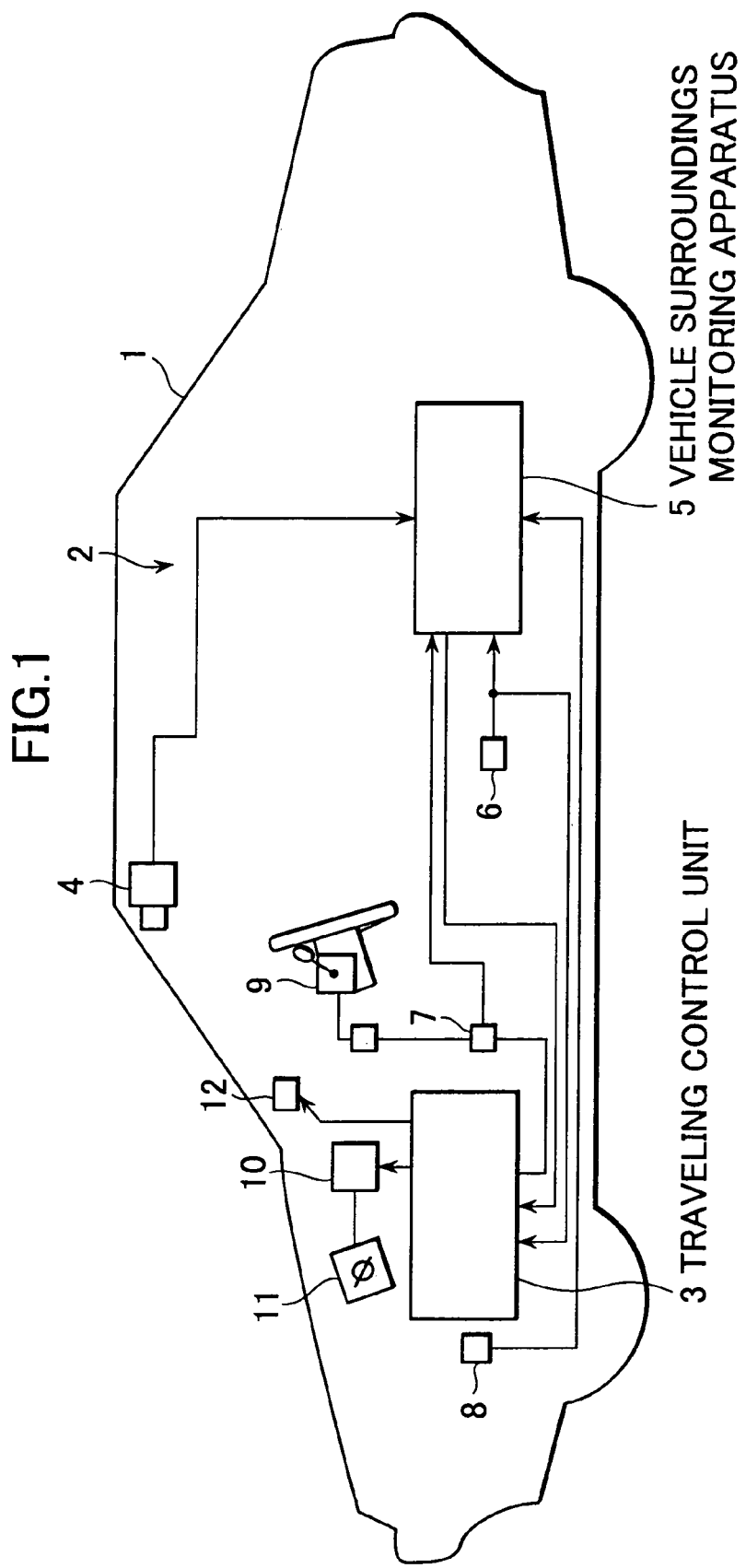

$D_B$ $D_V$

VEHICLE DRIVE ASSIST SYSTEM

BACKGROUND OF THE INVENTION

1. Field of the Invention

The present invention relates to a vehicle drive assist system for making a follow-up control targeting a preceding vehicle which travels in front of an own vehicle, taking a vehicle traveling in front of the preceding vehicle into consideration based on frontal information detected by a stereoscopic camera, a millimeter wave radar and the like.

2. Discussion of Related Arts

In recent years, a vehicle traveling control system in which a preceding vehicle existing ahead of an own vehicle or a vehicle ahead of the preceding vehicle are detected from traveling circumstances detected by a stereoscopic camera, a millimeter wave radar and the like and a follow-up traveling control targeting the preceding vehicle is performed, has been put into practical use.

For example, Japanese Patent Application Laid-open No. Toku-Kai-Hei 11-108661 discloses a technique in which, when a relatively small vehicle or a motor cycle cuts in ahead of the own vehicle, these vehicles can be recognized and accurately followed up by monitoring circumstances in front of the own vehicle taken with an imaging apparatus using a monitoring window or a follow-up window.

However, in case of such a technology as described above, for example, there is a problem that, when the motor cycle established as a follow-up object is undertaking to pass the vehicle in front of the motorcycle, also the own vehicle accelerates in order to catch up with the motorcycle. As a result, the own vehicle comes too close to the vehicle traveling in front of the preceding vehicle.

SUMMARY OF THE INVENTION

It is an object of the present invention to provide a vehicle drive assist system capable of making an optimal follow-up control according to traveling conditions in case where a preceding vehicle undertakes to pass a vehicle traveling ahead of the preceding vehicle.

In order to attain that object, a drive assist system having solid object detecting means for detecting frontal solid objects including a preceding vehicle traveling ahead of an own vehicle and a second preceding vehicle traveling ahead of the preceding vehicle and traveling control means including follow-up traveling control means for establishing the preceding vehicle as a follow-up object and for controlling a traveling of the own vehicle so as to follow up the preceding vehicle, comprises means for inhibiting an acceleration of the own vehicle following up the preceding vehicle when a first state where the preceding vehicle undertakes to pass the second preceding vehicle is detected, means for continuing to establish the preceding vehicle as a follow-up object until a second state where the preceding vehicle travels in parallel with the second preceding vehicle is detected, means for changing the follow-up object from the preceding vehicle to the second preceding vehicle when the second state changes to a third state where the speed of the preceding vehicle is larger than that of the second preceding vehicle, and means for continuing to establish the preceding vehicle as the follow-up object when the second state changes to a fourth state where the speed of said preceding vehicle is smaller than that of the second preceding vehicle.

Further, in a state where the preceding vehicle and the second preceding vehicle run in parallel, the preceding vehicle can be accurately discriminated from the second preceding vehicle based on the memorized widths of theses vehicle and the direction of the movement of the preceding vehicle.

BRIEF DESCRIPTION OF THE DRAWINGS

FIG. 1 is a schematic view showing a vehicle incorporating a vehicle drive assist system according to a first embodiment of the present invention;

DETAILED DESCRIPTION OF THE PREFERRED EMBODIMENT

Figure 2A:
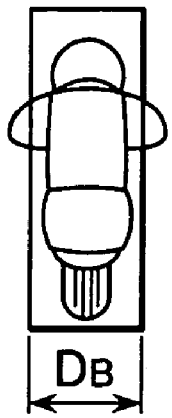
FIG. 2a is a schematic view of a window for a motorcycle.

Referring now to FIG. 1, reference numeral 1 denotes a vehicle (own vehicle) on which an intervehicle distance automatically adjusting system (Adaptive Cruise Control: ACC) 2 as an example of a vehicle drive assist system, is mounted. The ACC system 2 is constituted by a traveling control unit 3, a stereoscopic camera 4 and a vehicle surroundings monitoring apparatus 5. When the ACC system is set to a constant speed control mode, the vehicle travels at a speed established by a vehicle driver and when the system is set to a follow-up traveling control mode, the vehicle travels at a speed targeting the speed of a preceding vehicle with a constant intervehicle distance to the preceding vehicle maintained.

The stereoscopic camera 4 constituting vehicle forward information detecting means is composed of a pair (left and right) of CCD cameras using a solid-state image component such as Charge Coupled Device and the left and right cameras are transversely mounted on a front ceiling of a passenger compartment at a specified interval of distance, respectively. The respective cameras take picture images of an outside object from different view points and input the picture images to the vehicle surroundings monitoring apparatus 5.

Further, the own vehicle 1 has a vehicle speed sensor 6 for detecting a vehicle speed and the detected vehicle speed is inputted to the traveling control unit 3 and the vehicle surroundings monitoring apparatus 5, respectively. Further, the Own vehicle 1 has a steering wheel angle sensor 7 for detecting a steering wheel rotation angle and a yaw rate sensor 8 for detecting a yaw rate of the own vehicle 1. Signals indicative of steering wheel rotation angles and yaw rates are inputted to the vehicle surroundings monitoring apparatus 5.

Further, the own vehicle 1 has a collision warning lamp 12 lighting in case where there is a possibility that the own vehicle 1 collides with frontal obstacles (for example, a preceding vehicle, a parked vehicle and other solid objects existing in a traveling region of the own vehicle) in an instrument panel (not shown). The collision warning lamp 12 is lit by an output signal from the traveling control unit 3.

The vehicle surroundings monitoring apparatus 5 inputs respective signals indicative of images from the stereoscopic camera 4, vehicle speeds, steering wheel rotation angles, yaw rates and detects frontal information such as solid object data, side wall data, lane marker data and the like based on the images from the stereoscopic camera 4. On the basis of these frontal information and the traveling conditions of the own vehicle 1, a traveling path of the own vehicle 1 (hereinafter, referred to as an own traveling path) is estimated. A traveling region is established based on the own traveling path and the preceding vehicle, the vehicle traveling ahead of the preceding vehicle and the like are recognized according to the state of existence of solid objects in the traveling region and those results are outputted to the traveling control unit 3. The vehicle surroundings monitoring apparatus 5 acts as solid object detecting means.

The estimation of the own traveling path described above is performed as follows. In this embodiment, the coordinate system of the three-dimensional real space is transferred to a coordinate system fixed to the own vehicle 1. That is, the coordinate system is composed of X coordinate extending in a widthwise direction of the own vehicle 1, Y coordinate extending in a vertical direction of the own vehicle 1, Z coordinate extending in a lengthwise direction of the own vehicle 1 and an origin of the coordinate placed on the road surface directly underneath the central point of two CCD cameras. The positive sides of X, Y and Z coordinates are established in a right direction, in an upward direction and in a forward direction, respectively.

Method A: Estimation of Traveling Path Based on Lane Markers

In case where both or either of left and right lane markers data are obtained and the profile of the lane on which the own vehicle 1 travels can be estimated from these lane markers data, the traveling path of the own vehicle is formed in parallel with the lane markers in consideration of the width of the own vehicle 1 and the position of the own vehicle 1 in the present lane.

Method B: Estimation of Traveling Path Based on Side Wall Data Such as Guardrails, Curbs, and the Like In case where both or either of left and right side walls data are obtained and the profile of the lane on which the own vehicle 1 travels can be estimated from these side walls data, the traveling path of the own vehicle is formed in parallel with the side walls in consideration of the width of the own vehicle 1 and the position of the own vehicle 1 in the present lane.

Method C: Estimation of Traveling Path Based on a Trace of the Preceding Vehicle The own traveling path is estimated based on the past traveling trace extracted from the solid object data of the preceding vehicle.

Method D: Estimation of Path Based on Trace of the Own Vehicle

The own traveling path is estimated based on the traveling conditions such as yaw rate $\gamma$, vehicle speed V and steering wheel rotation angle $\theta H$ of the own vehicle 1 according to the following processes:

First, it is judged whether or not the yaw rate sensor 8 is effective. If it is effective, the present turning curvature Cua is calculated according to the following formula (1).

$$Cua = \gamma/V \quad (1)$$

On the other hand, if the yaw rate sensor 8 is ineffective, it is judged whether or not the vehicle is steered at a steering angle $\delta$ more than a prescribed angle (for example 0.57 radian) obtained from the steering wheel rotation angle $\theta H$. In case where the vehicle is steered at a steering angle more than 0.57 radian, the present turning curvature Cua is calculated according to the following formulas (2), (3) using the steering angle $\delta$ and the vehicle speed V of the own vehicle 1:

$$Re = (1 + A \cdot V^2) \cdot (L/\delta) \quad (2)$$

$$Cua = 1/Re \quad (3)$$

where Re is turning radius; A is stability factor of the vehicle; and L is wheelbase of the vehicle.

Further, if the steering angle is smaller than 0.57 radian, the present turning curvature is set to 0 (in a straightforward traveling condition).

Then, an average turning curvature is calculated from total turning curvatures for the past specified time (for example, 0.3 seconds) including the present turning curvature Cua thus obtained and the own traveling path is estimated from the average turning curvature.

Even in case where the yaw rate sensor 8 is effective and the present turning curvature Cua is calculated according to the formula (1), if the steering angle $\delta$ is smaller than 0.57 radian, the present turning curvature Cua may be corrected to 0 (straightforward traveling condition).

The traveling region of the own vehicle 1 is established by adding a width 1.1 meters to the left and right sides of thus estimated own traveling path, respectively.

Describing the processing of images from the stereoscopic camera 4 in the vehicle surroundings monitoring apparatus 5, with respect to a pair of stereoscopic images of surroundings taken by the stereoscopic camera 4 in a forward direction of the own vehicle 1, distance information over the entire image is obtained from the deviation amount between two corresponding positions according to the principle of trianguration and a distance image representing three-dimensional distance distribution is formed based on the distance information. Then, lane marker data, side wall data such as guardrails, curbs and side walls arranged along the road and solid object data such as vehicles and the like, are extracted based on the distance image by means of the known grouping process and the like by referring to frames (windows) of the three-dimensional road profile data, sidewall data, solid object data and the like stored beforehand.

Figure 2B:
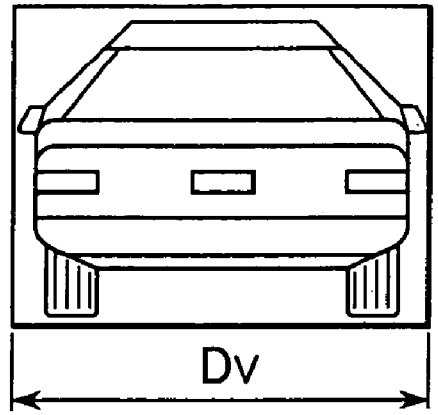
FIG. 2b is a schematic view of a window for a four wheel vehicle.
Figure 5:
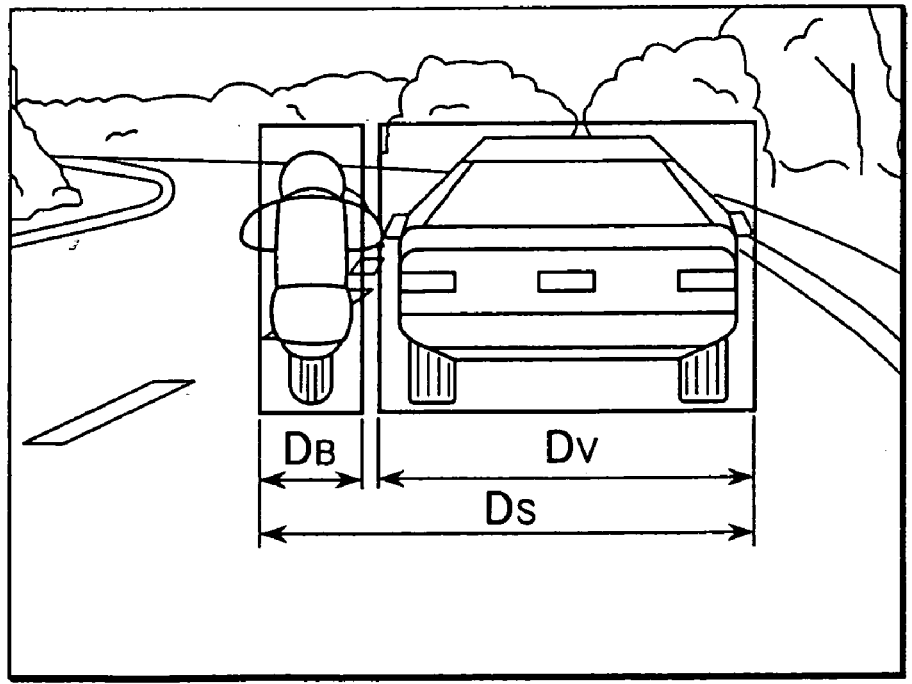
FIG. 5 is a schematic view showing a situation in which a motorcycle travels in parallel with a second preceding vehicle during a follow-up traveling control.

These windows used for the extraction of the solid object data have been preestablished like a dedicated window for motor cycles as shown in FIG. 2a, and a dedicated window for four-wheel vehicles as shown in FIG. 2b. The dedicated window for motor cycles has a narrow width DB and the one for four-wheel vehicles has a wide width DV. The width of the extracted solid objects (width of window) is finally corrected to the width of the solid object data subjected to the grouping process. In case where objects existing at the same distance ahead are applied to a certain window, for example, there is possibility that the state of running in parallel is recognized as one large object having a width DS, as shown in FIG. 5. Hence, in the present embodiment, in case where the width of the window exceeds a preestablished value, the preceding vehicle is discriminated from the vehicle traveling ahead of the preceding vehicle based on the direction of the passing preceding vehicle, the width of the preceding vehicle and the width of the vehicle traveling ahead of the preceding vehicle. These widths of the preceding vehicle and the vehicle traveling ahead of the preceding vehicle are memorized before it is judged that the width of the window exceeds the preestablished value. In this case, either of the widths of the preceding vehicle and the vehicle traveling ahead of the preceding vehicle may be memorized.

A different number is assigned to thus extracted lane marker data, side wall data and solid object data, respectively. Further, the solid object data are classified into stationary objects, a forward moving object moving in the same direction as the own vehicle 1 and the like based on the relationship between the relative displacement of the distance from the own vehicle 1 and the vehicle speed of the own vehicle 1 and are outputted. If there is an outstanding forward moving object detected successively for a specified time and the solid object is located nearest to the own vehicle 1, the solid object is deemed to be a preceding vehicle and registered as such. Further, a forward moving object existing in front of the preceding vehicle in the own traveling region of the own vehicle 1 is registered as a vehicle traveling ahead of the preceding vehicle (hereinafter referred to as a second preceding vehicle). The situation where the preceding vehicle passes the second preceding vehicle is judged from the state where the intervehicle distance between the preceding vehicle and the second preceding vehicle is decreasing or from the state where the widthwise movement of the preceding vehicle is detected. The intervehicle distance between the preceding vehicle and the second preceding vehicle is calculated from a difference of the intervehicle distance between the own vehicle and the preceding vehicle from the intervehicle distance between the own vehicle and the second preceding vehicle.

The traveling control unit 3 acts as traveling control means and is connected with a constant speed traveling switch 9, the vehicle surroundings monitoring apparatus 5, the vehicle speed sensor 6 and the like. The traveling control unit 3 has a function of a constant speed control in which the traveling speed is maintained at a speed established by a driver and a function of a follow-up traveling control in which the intervehicle distance between the own vehicle 1 and a solid object like a preceding vehicle is kept constant. The constant speed traveling switch 9 is disposed at the lateral side of the steering column and is constituted by a plurality of switches connected with a constant speed traveling selector lever.

The constant speed traveling switch 9 is constituted by a speed setting switch for setting a target vehicle speed at a constant speed traveling, a coast switch for changing the target vehicle speed in a descending direction and a resume switch for changing the target vehicle speed in an ascending direction. Further, a main switch (not shown) for switching the traveling control on or off is disposed in the vicinity of the constant speed traveling selector lever.

When a driver turns the main switch on and sets a desired vehicle speed by operating the constant speed traveling selector lever, a signal indicative of the desired vehicle speed inputs from the constant speed traveling switch 9 to the traveling control unit 3 and a throttle valve 11 driven by a throttle actuator 10 makes a feed-back control so as to converge the vehicle speed detected by the vehicle speed sensor 6 to the established vehicle speed. As a result, the own vehicle 1 can travel at a constant speed automatically.

Figure 7:
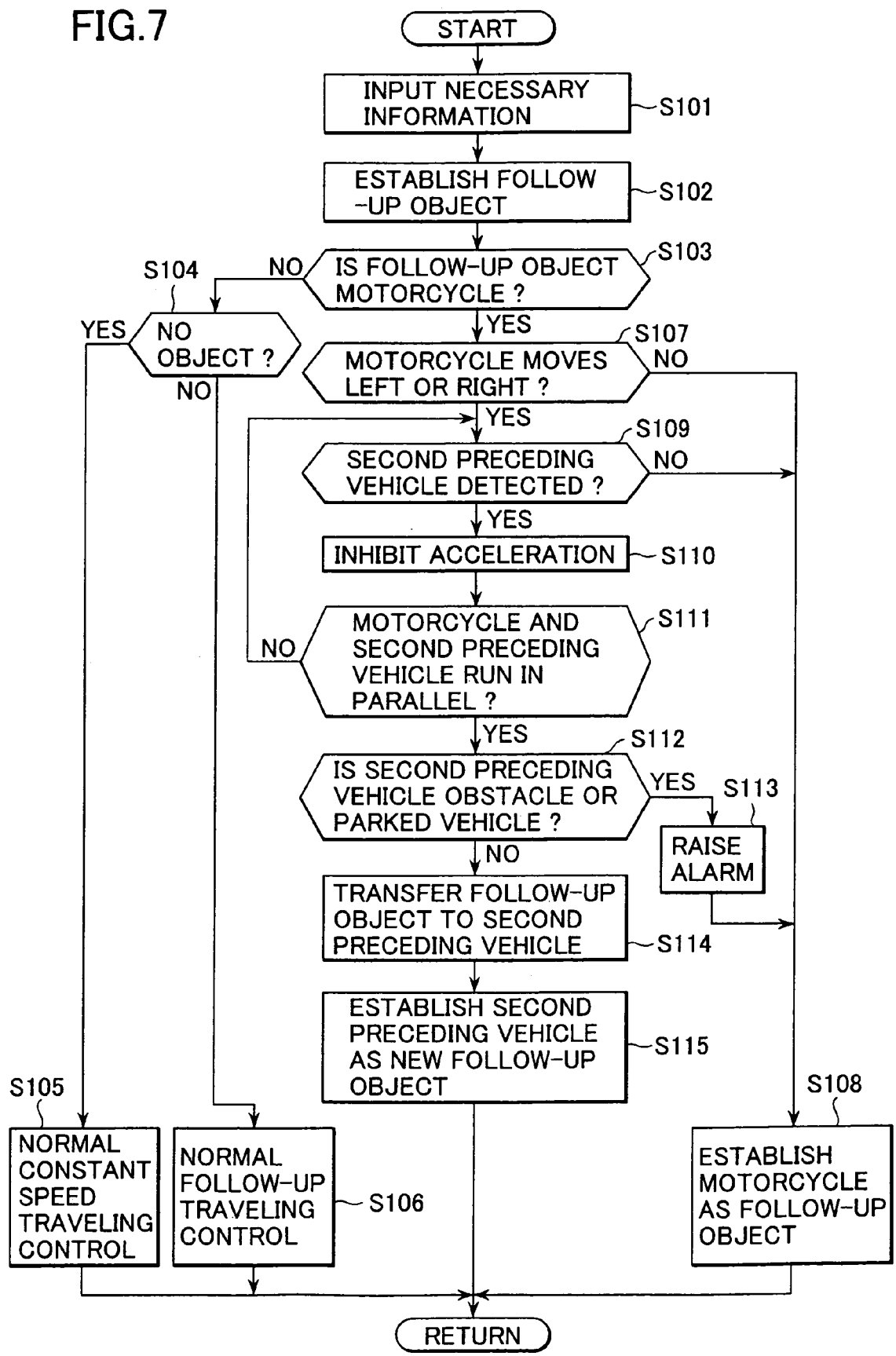
FIG. 7 is a flowchart showing a routine of a follow-up traveling control.

Further, when the traveling control unit 3 makes a constant traveling control, supposing a case where the vehicle surroundings monitoring apparatus 5 recognizes a preceding vehicle, which is traveling at a lower speed than the established vehicle speed of the own vehicle 1, the preceding vehicle is established as an object to be followed up and the traveling control unit 3 automatically changes over to a follow-up traveling control mode in which the own vehicle 1 travels with an established intervehicle distance retained. As shown in the flowchart of FIG. 7, in case where the preceding vehicle established as the object to be followed up passes the second preceding vehicle, an object to be followed up is automatically shifted to that overtaken vehicle.

When the constant speed traveling control mode transfers to the follow-up traveling control mode, an appropriate target value of an intervehicle distance between the own vehicle 1 and the preceding vehicle is established based on the intervehicle distance between the own vehicle 1 and the preceding vehicle, the vehicle speed of the own vehicle 1 detected by the vehicle speed sensor 6 and the vehicle speed of the preceding vehicle. Further, a drive signal is outputted to the throttle actuator 10 so that the intervehicle distance agrees with the target value. As a result, the opening angle of the throttle valve 11 is feedback-controlled and the own vehicle 1 follows up the preceding vehicle with a constant intervehicle distance retained.

Further, in the traveling control unit 3, as hereinafter will be described in more detail by a flowchart of FIG. 7, particularly in case where the preceding vehicle as an object of following-up is a motor cycle, when the motor cycle makes an acceleration to pass the vehicle traveling ahead of the preceding vehicle, the traveling control unit 3 is designed so as to inhibit acceleration.

Further, the traveling control unit 3 is designed so as to continue to establish the motorcycle as a follow-up object until the motor cycle runs in parallel with the second preceding vehicle. If the second preceding vehicle is established to be a follow-up object before the preceding vehicle runs in parallel with the second preceding vehicle, since the own vehicle 1 is controlled according to the intervehicle distance between the own vehicle 1 and the second preceding vehicle, there is fear that the own vehicle 1 comes close to the motor cycle.

Further, particularly in case where the preceding vehicle of a follow-up object is a motor cycle, and in case where the motor cycle passes a parked vehicle, the traveling control unit 3 has a function to light the collision warning lamp 12 for a specified time (during which the own vehicle comes near the parked vehicle). The specified time may be established to be smaller as the speed of the own vehicle 1 is higher. Further, the collision warning lamp 12 may be lit until the own vehicle 1 comes close to the parked vehicle within a specified distance. Further, the specified distance may be established to be longer as the vehicle speed is high.

Next, a follow-up traveling control routine in the traveling control unit 3 will be described by referring to a flowchart of FIG. 7. This program is executed every specified time interval after the traveling control transfers to the follow-up traveling control mode.

First, at S101, desired information and parameters, specifically, information about the preceding vehicle and the second preceding vehicle (including distance information and vehicle speed information) is inputted from the vehicle surroundings monitoring apparatus 5 and the vehicle speed of the own vehicle 1 is inputted from the vehicle speed sensor 6.

Then, the program goes to S102 where the preceding vehicle detected by the vehicle surroundings monitoring apparatus 5 is established a follow-up object. In case where the existence of the preceding vehicle is not recognized in the vehicle surroundings monitoring apparatus 5, it is judged that there is no follow-up object.

Then, the program goes to S103 where it is judged whether or not the present follow-up object is a motorcycle. In case where the follow-up object is not a motorcycle, the program goes to S104 where it is judged whether or not there is no follow-up object. As a result of the judgment at S104, when it is judged that there is no follow-up object, the program goes to S105 where the traveling control transfers to a normal constant traveling control mode, in which a throttle valve 11 driven by a throttle actuator 10 makes a feed-back control so as to converge the vehicle speed detected by the vehicle speed sensor 6 to the established vehicle speed, and the own vehicle 1 travels at a constant speed automatically, leaving the routine.

Further, as a result of the judgment at S104, in case where it is judged that there is a follow-up object, the program goes to S106 where the normal follow-up control is performed. That is, an appropriate target value of the intervehicle distance between the own vehicle land the preceding vehicle is established based on the intervehicle distance between the own vehicle 1 and the preceding vehicle, the vehicle speed of the own vehicle 1 detected by the vehicle speed sensor 6 and the vehicle speed of the preceding vehicle. Further, a drive signal is outputted to the throttle actuator 10 so that the intervehicle distance agrees with the target value. As a result, the opening angle of the throttle valve 11 is feedback-controlled and the own vehicle 1 follows up the preceding vehicle with a constant intervehicle distance retained. After that, the program leaves the routine.

Figure 3:
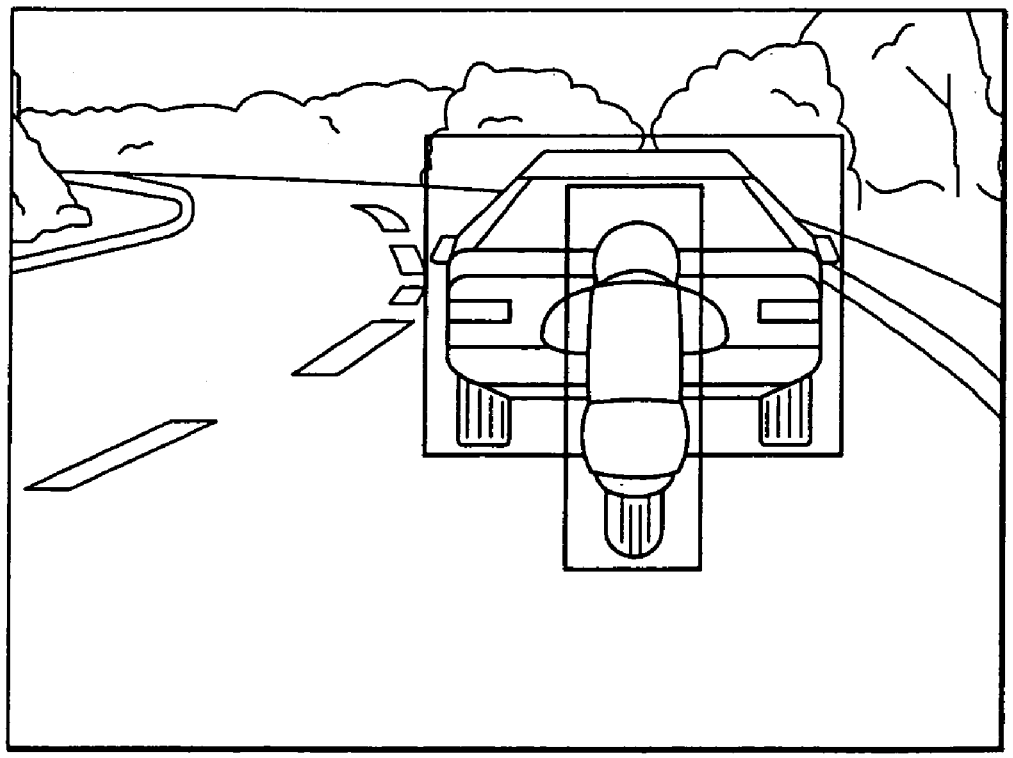
FIG. 3 is a schematic view showing a situation in which a motorcycle is a follow-up object.

On the other hand, in case where it is judged at S103 that the present follow-up object is a motorcycle (refer to FIG. 3), the program goes to S107 where it is judged whether or not the motorcycle moves either left or right within the own traveling region.

As a result of the judgment at S107, in case where the motorcycle moves in neither directions, the program goes to S108 where the motorcycle is continued to be treated as a follow-up object and the follow-up control targeting the motorcycle is performed in the same manner as described in S106, leaving the routine.

Further, as a result of the judgment at S107, in case where the motorcycle moves either left or right, the program goes to S109 where it is judged whether or not the second preceding vehicle is detected.

In case where it is judged at S107 that the motorcycle of the follow-up object moves either left or right and the second preceding vehicle is detected at S109, it is judged that the motorcycle is in the course of overtaking the second preceding vehicle. Alternatively, in case where it is judged at S107 that the motorcycle moves either left or right and the intervehicle distance between the preceding vehicle and the second preceding vehicle is decreasing, it may be judged that the motorcycle is overtaking the second preceding vehicle. In case where the second preceding vehicle is not detected at S109, the program goes to S108 where the follow-up control aiming at the motorcycle is performed in the same manner as described in S106, leaving the routine.

Figure 4:
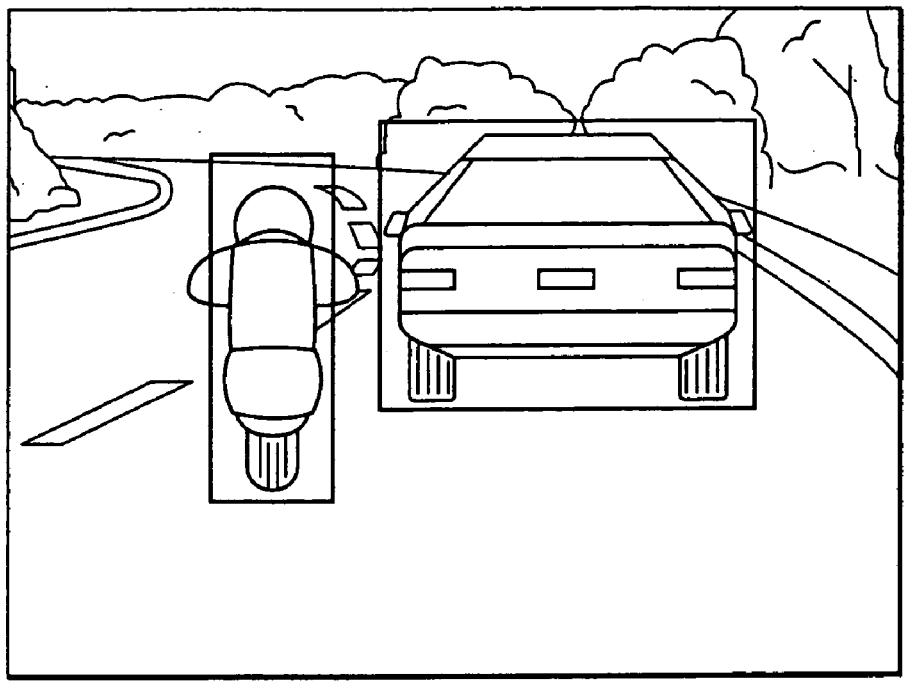
FIG. 4 is a schematic view showing a situation in which a motorcycle moves left during a follow-up traveling control.

Further, in case where the second preceding vehicle is detected at S109 (refer to FIG. 4), the program goes to S110 where an acceleration control of the ACC system is placed in a stand-by condition, that is, the acceleration of the own vehicle 1 is inhibited, even in case where the motorcycle makes acceleration.

Then, the program goes to S111 where it is judged whether or not the motorcycle travels in parallel with the second preceding vehicle based on the distance to the preceding vehicle and the distance to the second preceding vehicle. In case where the motorcycle travels in parallel with the second preceding vehicle (refer to FIG. 5), the program goes to S112. In case where the motorcycle does not travel in parallel with the second preceding vehicle, the program returns to S109 where the detection of the second preceding vehicle is performed. If the second preceding vehicle is detected, at S110 the follow-up traveling control targeting the motorcycle is performed while the ACC acceleration control is in a stand-by condition. That is, the motorcycle is a follow-up object until the motorcycle runs in parallel with the second preceding vehicle.

When it is judged at S111 that the motorcycle runs in parallel with the second preceding vehicle and the program goes to S112, it is judged whether or not the second preceding vehicle is an obstacle or a parked vehicle. If it is judged that the second preceding vehicle is an obstacle or a parked vehicle, the program goes to S113 where a warning is outputted, that is, the collision warning lamp 12 is lit for a specified time until the own vehicle 1 comes close to the parked vehicle and then goes to S108 where the follow-up control targeting the motorcycle is continued, leaving the routine.

Figure 6:
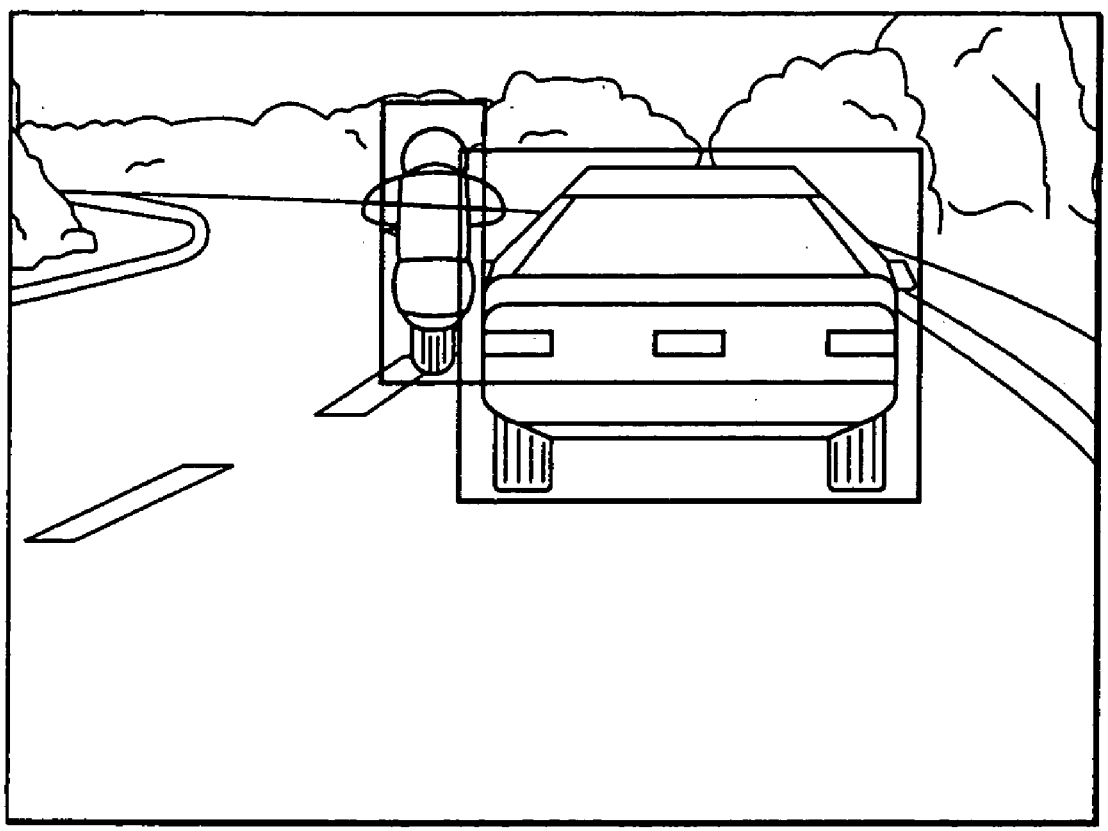
FIG. 6 is a schematic view showing a situation in which a motorcycle overtakes a second preceding vehicle during s follow-up traveling control.

On the other hand, as a result of the judgment at S112, in case where it is judged that the second preceding vehicle is neither an obstacle nor a parked vehicle, the program goes to S114 where the second preceding vehicle is established as a new follow-up object and at S115 the second preceding vehicle starts to be followed up, leaving the routine. This situation is illustrated in FIG. 6.

According to the first embodiment of the present invention, when the preceding vehicle of the own vehicle 1 is a motorcycle and the motorcycle is established as a follow-up object, the widthwise movement of the motorcycle is detected, further when the second preceding vehicle traveling ahead of the motorcycle is detected, the own vehicle 1 is inhibited to accelerate, in case where the motorcycle makes an acceleration. Hence, even in case where the motorcycle attempts to overtake the second preceding vehicle, the own vehicle 1 is inhibited to accelerate and as a result the own vehicle 1 is prevented from coming too close to the second preceding vehicle.

Further, since the motorcycle is established as a follow-up object until the motorcycle travels in parallel with the second preceding vehicle, the own vehicle 1 does not come too close to the motorcycle.

Under such a condition as the motorcycle and the four wheel vehicle run in parallel, there is possibility that these objects are recognized as one large object having a width DS. In the first embodiment, first the width of the preceding vehicle and the width of the second preceding vehicle are memorized, respectively. In case where an object having such a large width DS is detected, which side of the second preceding vehicle the preceding is overtaking on is judged from the direction of moving of the preceding vehicle and the preceding vehicle can be accurately recognized separately from the second preceding vehicle based on the direction of moving of the preceding vehicle and the width of respective vehicles.

Figure 8:
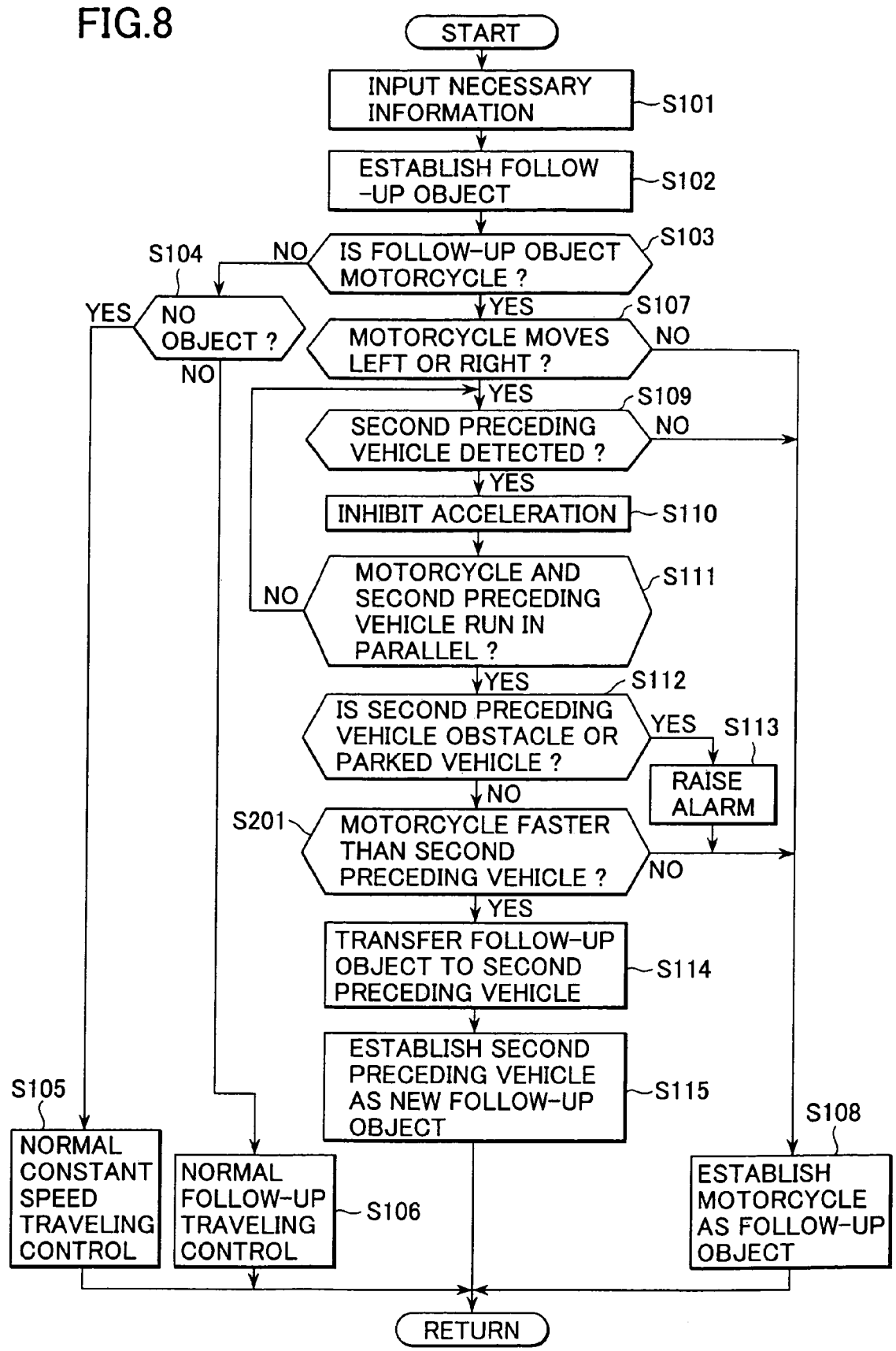
FIG. 8 is a flowchart showing a routine of a follow-up traveling control according to a second embodiment.

FIG. 8 is a flowchart of a follow-up control program according to a second embodiment. The feature of the second embodiment is that, in case where the motorcycle travels in parallel with the second preceding vehicle and the second preceding vehicle is neither an obstacle nor a parked vehicle, a vehicle traveling slower is established as a follow-up object. Other functions except this feature are identical to those described in the first embodiment.

That is, as shown in the flowchart of FIG. 8, as a result of the judgment at S112, in case where it is judged that the second preceding vehicle is neither an obstacle nor a parked vehicle, the program goes to S201. At S201, if the speed of the second preceding vehicle is larger than that of the motorcycle, the program goes to S108 where the motorcycle is still be established as a follow-up object, leaving the routine.

On the other hand, if the speed of the motorcycle is larger than that of the second preceding vehicle, the program goes to S114 where the follow-up object is transferred to the second preceding vehicle and then goes to S115 where the second preceding vehicle is established as a new follow-up object, leaving the routine.

Thus, according to the second embodiment, since the speed of the motorcycle is compared with that of the second preceding vehicle traveling in parallel and the follow-up object can be appropriately selected, more accurate and more practical control is available.

In the respective embodiments of the present invention, the motorcycle is exemplified as a preceding vehicle and the follow-up control has been described about the case in which the preceding vehicle (motorcycle) overtakes the second preceding vehicle (four wheel vehicle). However, the four wheel vehicle may be a preceding vehicle and the same follow-up control may be applied to the case in which the preceding vehicle (four wheel vehicle) overtakes the second preceding vehicle (four wheel vehicle)

The entire contents of Japanese Patent Application No. Tokugan 2003-056271 filed Mar. 3, 2003, is incorporated herein by reference.

While the present invention has been disclosed in terms of the preferred embodiments in order to facilitate better understanding of the invention, it should be appreciated that the invention can be embodied in various ways without departing from the principle of the invention. Therefore, the invention should be understood to include all possible embodiments which can be embodied without departing from the principle of the invention set out in the appended claims.

What is claimed is:

1. A drive assist system for a driver's own vehicle at least having a solid object detecting unit for detecting frontal solid objects including a first preceding vehicle traveling ahead of said own vehicle and a second preceding vehicle traveling ahead of said first preceding vehicle and a traveling control unit including a constant speed traveling control unit for controlling a vehicle speed of said own vehicle so as to travel at a constant speed and a follow-up traveling control unit for establishing said preceding vehicle as a follow-up object and for controlling traveling of said own vehicle so as to follow said preceding vehicle, comprising;
    means for inhibiting an acceleration of said own vehicle following said first preceding vehicle according to said follow-up traveling control unit when a first state is detected where said first preceding vehicle undertakes to pass said second preceding vehicle;
    means for continuing to establish said first preceding vehicle as said follow-up object until a second state is detected where said first preceding vehicle travels in parallel with said second preceding vehicle;
    means for changing said follow-up object from said first preceding vehicle to said second preceding vehicle when said second state changes to a third state where the speed of said first preceding vehicle is larger than that of said second preceding vehicle, and means for continuing to establish said first preceding vehicle as said follow-up object when said second state changes to a fourth state where the speed of said first preceding vehicle is smaller than that of said second preceding vehicle.

2. The drive assist system according to claim 1, wherein said solid object detecting unit includes means for calculating at least one of widths of said first preceding vehicle and said second preceding vehicle and means for discriminatingly recognizing said first preceding vehicle and said second preceding vehicle based on the direction of the first preceding vehicle passing the second preceding vehicle and said widths.

3. The drive assist system according to claim 1, wherein said traveling control unit includes means for raising an alarm when it is judged that said second preceding vehicle is a stationary object.

4. The drive assist system according to claim 1, wherein said first state is detected by such judgment that an inter-vehicle distance between said first preceding vehicle and said second preceding vehicle decreases.

5. The drive assist system according to claim 1, wherein said first state is detected by such judgment that said first preceding vehicle moves sideways and said second preceding vehicle is detected.

6. The drive assist system according to claim 1, wherein said second state is detected by such judgment that a distance to said first preceding vehicle and a distance to said second preceding vehicle is approximately equal.

7. The drive assist system according to claim 1, wherein said first preceding vehicle is a two-wheel vehicle.

8. A drive assist system for a driver's own vehicle comprising:
    a solid object detecting unit for detecting frontal said objects including a first preceding vehicle ahead of said own vehicle and a second preceding vehicle ahead of said first preceding vehicle;
    a traveling control unit for establishing a follow-up object and for controlling said own vehicle so as to follow said follow-up object; and
    an inhibiting unit for inhibiting an acceleration of said own vehicle;
    wherein said inhibiting unit inhibits acceleration of said own vehicle when said traveling control unit establishes said first preceding vehicle as said follow-up object and controls said own vehicle so as to follow said first preceding vehicle and when a first state is detected where said first preceding vehicle undertakes to pass said second preceding vehicle.

9. The drive assist system according to claim 8, wherein said first state is detected by such judgment that an inter-vehicle distance between said first preceding vehicle and said second preceding vehicle decreases.

10. The drive assist system according to claim 8, wherein said first state is detected by such judgment that said first preceding vehicle moves sideways and said second preceding vehicle is detected.

11. The drive assist system according to claim 8, further comprising:
    a follow-up continuing unit for continuing to establish said first preceding vehicle as said follow-up object;
    wherein said follow-up continuing unit continues to establish said first preceding vehicle as said follow-up object until a second state is detected where said first preceding vehicle travels in parallel with said second preceding vehicle.

12. The drive assist system according to claim 8, further comprising:
   a follow-up object changing unit for changing said follow-up object from said first preceding vehicle to said second preceding vehicle;
   wherein said follow-up object changing unit changes said follow-up object from said first preceding vehicle to said second preceding vehicle when the speed of said first preceding vehicle is larger than that of the said second preceding vehicle.

13. The drive assist system according to claim 8, further comprising:
   a follow-up continuing unit for continuing to establish said first preceding vehicle as said follow-up object;
   wherein said follow-up continuing unit continues to establish said first preceding vehicle as said follow-up object when the speed of the first preceding vehicle is smaller than that of said second preceding vehicle.

14. The drive assist system according to claim 11, wherein said second state is detected by such judgment that a distance to said first preceding vehicle and a distance to said second preceding vehicle is approximately equal.

15. The drive assist system according to claim 8, wherein said solid object detecting unit comprises:
   a calculating unit for calculating at least one of widths of said first preceding vehicle and said second preceding vehicle; and
   a recognizing unit for discriminatingly recognizing said first preceding vehicle and said second preceding vehicle;
   wherein said recognizing unit recognizes said first preceding vehicle and said second preceding vehicle discriminatingly according to the direction of the first preceding vehicle passing the second preceding vehicle and said widths.

16. The drive assist system according to claim 8, wherein said traveling control unit includes means for raising an alarm when it is judged that said second preceding vehicle is a stationary object.

17. The drive assist system according to claim 8, wherein said first preceding vehicle is a two-wheel vehicle.

* * * * *